(12) United States Patent
Saeda et al.

(10) Patent No.: US 11,537,337 B2
(45) Date of Patent: Dec. 27, 2022

(54) IMAGE FORMING APPARATUS, STORAGE MEDIUM STORING PROGRAM FOR CONTROLLING IMAGE FORMING APPARATUS, AND METHOD FOR CONTROLLING IMAGE FORMING APPARATUS

(71) Applicant: SHARP KABUSHIKI KAISHA, Sakai (JP)

(72) Inventors: Masao Saeda, Sakai (JP); Yasuhiro Nakai, Sakai (JP); Kohichi Murakami, Sakai (JP); Yasutomo Hayano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/486,510

(22) Filed: Sep. 27, 2021

(65) Prior Publication Data

US 2022/0107766 A1 Apr. 7, 2022

(30) Foreign Application Priority Data

Oct. 2, 2020 (JP) .............................. JP2020-167742

(51) Int. Cl.
*G06F 3/12* (2006.01)
*H04N 1/00* (2006.01)

(52) U.S. Cl.
CPC .......... *G06F 3/1225* (2013.01); *G06F 3/1204* (2013.01); *G06F 3/1256* (2013.01); *H04N 1/0044* (2013.01)

(58) Field of Classification Search
None
See application file for complete search history.

(56) References Cited

U.S. PATENT DOCUMENTS

| 2013/0063734 | A1* | 3/2013 | Bell | ....................... G06F 3/1288 358/1.6 |
| 2015/0077772 | A1* | 3/2015 | Satou | .................. G06K 15/1825 358/1.11 |
| 2020/0026396 | A1* | 1/2020 | Murakami | ............ G06F 3/0482 |

FOREIGN PATENT DOCUMENTS

JP 2016-047606 A 4/2016

* cited by examiner

*Primary Examiner* — Frantz Bataille
(74) *Attorney, Agent, or Firm* — ScienBiziP, P.C.

(57) ABSTRACT

A multifunction peripheral as an example of an image forming apparatus according to the present disclosure has an office direct print function. According to the office direct print function, a print process based on application data generated by predetermined application software or compatible application software compatible with the application software may be directly executed without using a personal computer or the like. When a font is substituted in execution of the print process performed by the office direct print function, a caution message screen and a preview screen are displayed on a display of the multifunction peripheral before the print process is executed.

9 Claims, 19 Drawing Sheets

| NON-INSTALLED FONT | ALTERNATIVE FONT |
|---|---|
| ⋮ | ⋮ |

| ORIGINAL FONT | ALTERNATIVE FONT | SUBSTITUTION POSITION |
|---|---|---|
| ⋮ | ⋮ | ⋮ |

| PRIORITY LEVEL | MARKING FORM |
|---|---|
| 1 | FRAME |
| 2 | COLORING |
| 3 | UNDERLINE |

| PRIORITY LEVEL | REGION |
|---|---|
| 1 | LOWER RIGHT |
| 2 | UPPER RIGHT |
| 3 | LOWER LEFT |
| 4 | UPPER LEFT |

| PRIORITY LEVEL | ENLARGEMENT TARGET PORTION |
|---|---|
| 1 | LOWER LEFT |
| 2 | LOWER RIGHT |
| 3 | UPPER LEFT |
| 4 | UPPER RIGHT |

IMAGE FORMING APPARATUS, STORAGE MEDIUM STORING PROGRAM FOR CONTROLLING IMAGE FORMING APPARATUS, AND METHOD FOR CONTROLLING IMAGE FORMING APPARATUS

BACKGROUND OF THE INVENTION

Field of the Invention

The present disclosure relates to an image forming apparatus, a non-transitory computer readable storage medium storing a program for controlling the image forming apparatus, and a method for controlling the image forming apparatus.

Description of the Background Art

Japanese Unexamined Patent Application Publication No. 2016-47606 discloses a technology of analyzing print data (print job) received from a client device, such as a personal computer (PC), and displaying a preview image of a page in which a font substitution has occurred, when the font substitution occurs in an image forming apparatus, such as a printer or a multifunction peripheral (MFP). According to this technology, when the font substitution occurs, a user may recognize the occurred font substitution before a print process is executed.

Here, some image forming apparatuses have a so-called office direct print function that can accept input of application data (so-called office files, such as document files and spreadsheet files) generated by predetermined application software (so-called office software, such as word processing software and spreadsheet software) and perform a print process based on the application data. According to this office direct print function, a print process based on application data generated by predetermined application software can be directly executed without using an external device, such as a personal computer. In addition, in recent years, the office direct print function can support not only application data generated by predetermined application software, but also application data generated by compatible application software that is compatible with the predetermined application software. However, for application data generated by compatible application software, the same font (typeface data) as that included in the application data may not be available on the image forming apparatus side, in which case the font in question is substituted. Therefore, even in an image forming apparatus having an office direct print function, it would be extremely beneficial if a user can be notified of the font substitution, if any, before the printing process is executed.

Therefore, it is an object of the present disclosure to provide a novel technique for notifying a user of font substitution, if any, in an image forming apparatus having an office direct print function before the print process is executed.

SUMMARY OF THE INVENTION

To achieve this object, the present disclosure includes a first aspect relating to an image forming apparatus, a second aspect relating to a non-transitory computer readable storage medium storing a program for controlling the image forming apparatus, and a third aspect relating to a method for controlling the image forming apparatus.

The first aspect of the image forming apparatus includes an office direct print function. Specifically, the image forming apparatus according to the first aspect accepts an input of application data generated by predetermined application software or compatible application software compatible with the application software and is capable of executing a print process based on the application data. In addition, the image forming apparatus according to the first aspect includes an analyzer, a determiner, a caution information outputter, and a print image display. The analyzer analyzes the application data so as to analyze attribute information of the application data, for example. Then, the determiner determines, based on a result of the analysis performed by the analyzer, whether the font included in the application data is required to be substituted, that is, whether the same font as included in the application data is provided in the image forming apparatus. Furthermore, the cautionary information outputter outputs predetermined cautionary information in a visual manner or an auditory manner, for example, when the determiner determines that the font is to be substituted. In addition, the preview image display displays a preview image based on post-substitution data obtained after the font is substituted, when the determiner determines that the font is to be substituted.

Note that the preview image display may display the preview image with predetermined first marking applied to a portion corresponding to the substitution of the font in the preview image.

Note that the preview image display preferably applies, when second marking based on the application data is applied in advance to the portion corresponding to the substitution of the font in the preview image, the first marking of a different type from the second marking.

The preview image display may apply the first marking in a dynamic manner.

Furthermore, the preview image display may selectively display a first enlarged image obtained by enlarging a first region which is a portion of the preview image including a portion corresponding to the substitution of the font or the preview image or simultaneously display the first enlarged image and the preview image.

Alternatively, the preview image display may selectively display a second enlarged image obtained by enlarging a second region in the preview image or the preview image or simultaneously display the second enlarged image and the preview image. The second region herein refers to a portion of a region including a portion corresponding to protrusion in the preview image corresponding to a portion where an object included in the post-substitution data may protrude from a print range of a print process.

In addition, the preview image display may display the preview image with a predetermined third marking applied to the second region in the preview image.

Furthermore, the preview image display defines the second region based on whether the substituted font corresponds to horizontal writing or vertical writing.

Moreover, according to the first aspect, a transmitter may be further provided. The transmitter transmits preview image display data for displaying the preview image in a display included in a mobile terminal device to the mobile terminal device.

A non-transitory computer readable storage medium including a control program for an image forming apparatus according to the second aspect of the present disclosure causes a computer of the image forming apparatus to execute analyzing, determining, caution information outputting, and preview image displaying. Here, the image forming apparatus has an office direct print function. Specifically, the image forming apparatus accepts an input of application data generated by predetermined application software or compatible application software compatible with the application software and is capable of executing a print process based on the application data. Then, in the analyzing, the application data is analyzed. Thereafter, in the determining, it is determined whether the font included in the application data is required to be substituted based on a result of the analysis. Furthermore, in the caution information outputting, when it is determined that the font is required to be substituted, predetermined caution information is output. Moreover, in the preview image displaying, when it is determined that the font is required to be substitute, a preview image based on the post-substitution data obtained after the font is substituted is displayed.

The method for controlling an image forming apparatus according to the third aspect of the present disclosure includes analyzing, determining, caution information outputting, and preview image displaying. Here, the image forming apparatus has an office direct print function. Specifically, the image forming apparatus accepts an input of application data generated by predetermined application software or compatible application software compatible with the application software and is capable of executing a print process based on the application data. Then, in the analyzing, the application data is analyzed. Thereafter, in the determining, it is determined whether the font included in the application data is required to be substituted based on a result of the analysis. Furthermore, in the caution information outputting, when it is determined that the font is required to be substituted, predetermined caution information is output. Moreover, in the preview image displaying, when it is determined that the font is required to be substituted, a preview image based on the post-substitution data obtained after the font is substituted is displayed.

According to the present disclosure, in an image forming apparatus having an office direct print function, when a user may be notified of font substitution, if any, before the printing process is executed. This is extremely advantageous for the image forming apparatus having the office direct print function in which it is highly likely that a font is substituted.

BRIEF DESCRIPTION OF THE DRAWINGS

FIG. 8 is a diagram conceptually illustrating a configuration of an alternative font table according to the first embodiment;

FIG. 9 is a diagram conceptually illustrating a configuration of a font substitution implementation table according to the first embodiment;

FIG. 12 is a diagram conceptually illustrating a configuration of a marking rank table according to a second embodiment of the present disclosure;

FIG. 16 is a diagram conceptually illustrating a configuration of a horizontal-writing priority table according to the third embodiment;

FIG. 17 is a diagram conceptually illustrating a configuration of a vertical-writing priority table according to the third embodiment;

DESCRIPTION OF THE PREFERRED EMBODIMENTS

First Embodiment

Figure 1:
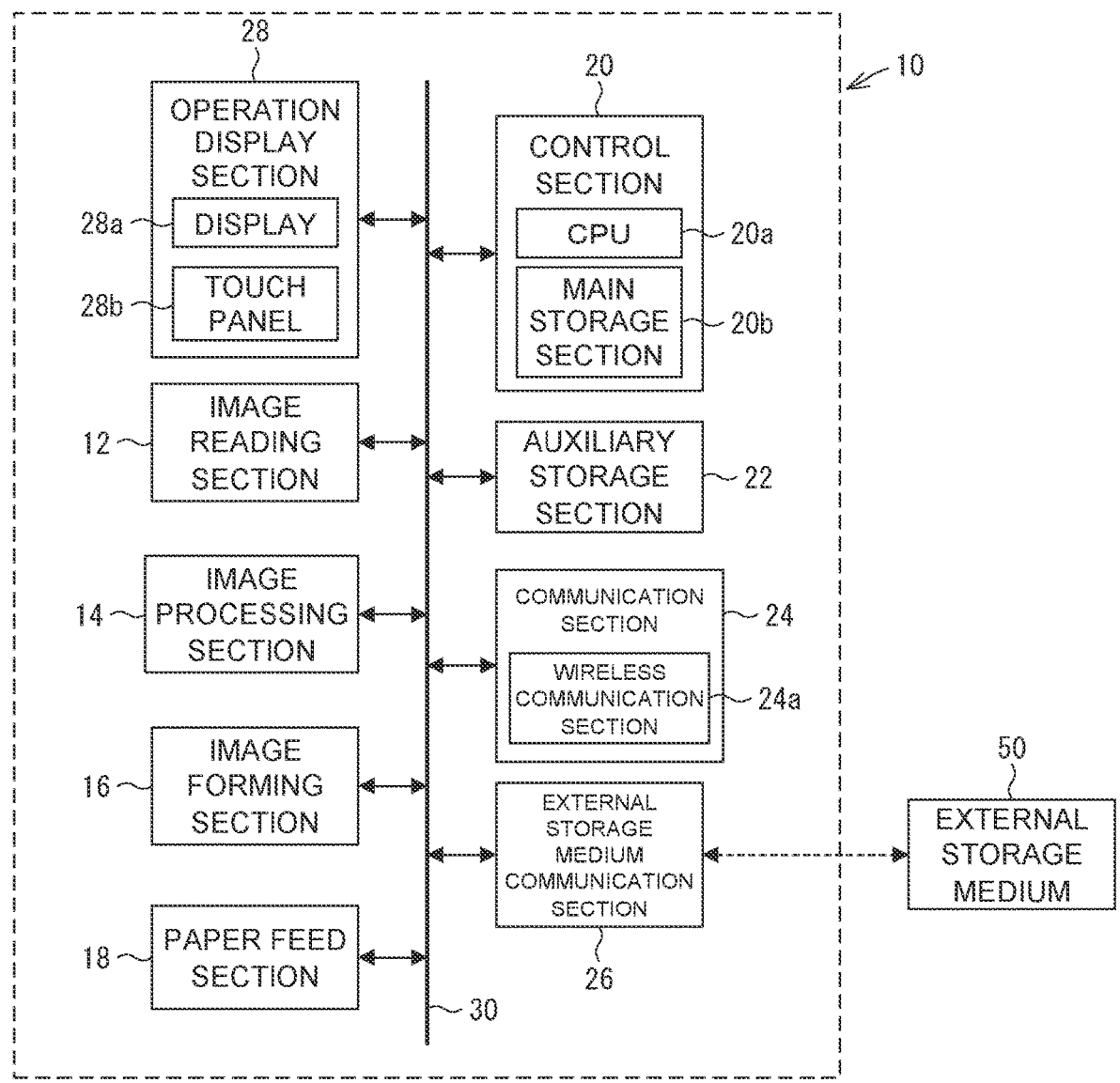
FIG. 1 is a block diagram illustrating an electrical configuration of a multifunction peripheral according to a first embodiment of the present disclosure.

A first embodiment of the present disclosure will be described by taking a multifunction peripheral 10 shown in FIG. 1 as an example.

The multifunction peripheral 10 according to the first embodiment has a plurality of functions, such as a copying function, a printing function, an image scanning function, and a faxing function. To this end, the multifunction peripheral 10 has an image reading section 12, an image processing section 14, an image forming section 16, and a paper feed section 18. The multifunction peripheral 10 further includes a control section 20, an auxiliary storage section 22, a communication section 24, and an external storage medium communication section 26. The multifunction peripheral 10 further includes an operation display section 28. These components are connected to one another through a common bus 30.

The image reading section 12 is an example of an image reader. Specifically, the image reading section 12 is responsible for an image reading process of reading an image of a document, not shown, and generating two-dimensional read image data corresponding to the read image. Therefore, the image reading section 12 includes a document table, not illustrated, on which a document is placed. The image reading section 12 further includes an image reading unit including a light source, a plurality of mirrors, an image forming lens, and a line sensor, not shown, and a driving mechanism, not shown, for shifting an image reading position of the image reading section 12. Furthermore, the image reading section 12 includes a document holder cover, not shown, for holding a document placed on the document table. Note that the document holder cover may include an automatic document feeder (ADF), not shown, which is one of optional devices.

The image processing section 14 is an example of an image processor. That is, the image processing section 14 performs appropriate image processing on various image data, such as the read image data. The image processing section 14 has an image processing executor, such as a digital signal processor (DSP), not shown. The image processing performed by the image processing section 14 includes a process of generating preview image data described below.

The image forming section 16 is an example of an image former. Specifically, the image forming section 16 performs an image forming process, that is, a print process, for forming, on paper as a sheet-shaped image recording medium, not illustrated, an image which is based on appropriate image data, such as data obtained after the image processing performed by the image processing section 14. The print process is performed by a general electrophotographic method (Carlson process method), for example. Therefore, the image forming section 16 includes a photosensitive drum, a charging device, an exposing device, a developing device, a transferring device, a fusing device, a cleaning device, and a discharging device, not illustrated. Paper subjected to the image processing performed by the image forming section 16, that is, a printed matter is discharged onto a paper discharge tray, not shown. The image forming section 16 is not limited to the one employing the electrophotographic method, and may be the one for executing the print process in accordance with another method, such as an ink jet method.

The paper feed section 18 is an example of a paper feeder. That is, the paper feed section 18 has one or more, for example, a plurality of paper feeding cassettes, not shown. Each of the paper feeding cassettes accommodates paper of an appropriate specified size. In addition, the paper feed section 18 includes one or more, for example, one manual feed tray. Paper of an appropriate size is also set in the manual feed tray. The paper feed section 18 uses one of the paper cassettes or the manual feed tray as a paper feed source, and supplies paper from the paper feed source to the image forming section 16 one by one.

The control section 20 is an example of a controller that performs overall control of the multifunction peripheral 10. Therefore, the control section 20 includes a computer as a control executor, such as a central processing unit (CPU) 20a. In addition, the control section 20 includes a main storage section 20b as a main storage to which the CPU 20a is directly accessible. The main storage section 20b includes a read-only memory (ROM) and a random access memory (RAM), not shown, for example. The ROM stores control programs for controlling operations of the CPU 20a, that is, so-called firmware. The RAM constitutes a working region and a buffer region that are used when the CPU 20a performs a process based on the control programs.

The auxiliary storage section 22 is an example of an auxiliary storage. Specifically, the auxiliary storage section 22 appropriately stores various data including various image data, such as the read image data described above. The auxiliary storage section 22 configured as described above includes a hard disk drive not illustrated, for example. The auxiliary storage section 22 may include a rewritable non-volatile memory, such as a flash memory.

The communication section 24 is an example of a communicator. Specifically, the communication section 24 is responsible for a bi-directional communication process via a communication network, not shown, when being connected to the communication network. Examples of the communication network include a local area network (LAN), the Internet, and a public switched telephone network. Furthermore, examples of the LAN include a wireless LAN, and in particular, Wi-Fi (registered trademark). Therefore, the communication section 24 has a wireless communication section 24a which is responsible for a wireless communication process based on Wi-Fi. In addition, the wireless communication section 24a is also responsible for a wireless communication process based on Bluetooth (registered trademark) which is one of near field communication standards. Furthermore, the wireless communication section 24a is also responsible for a wireless communication process based on IrDA (registered trademark) which is one of infrared communication standards.

The external storage medium communication section 26 is an example of an external storage medium communicator. Specifically, the external storage medium communication section 26 has a mounting section, not shown, on which a portable external storage medium 50 may be mounted. Then the external storage medium communication section 26 is responsible for bidirectional communication with the external storage medium 50 mounted on the mounting section. Note that examples of the external storage medium 50 include semiconductor media, such as a universal serial bus (USB) memory and a secure digital (SD) memory card, and disk media, such as a compact disc (CD) and a digital versatile disk (DVD).

The operation display section 28 is a so-called operation panel, and has a display 28a as an example of a display and a touch panel 28b as an example of an operation receiver. The display 28a has a roughly rectangular display surface, and the touch panel 28b is disposed so as to overlap the display surface of the display 28a. Note that the display 28a is, for example, a liquid crystal display (LCD), but it is not limited thereto and may be a display employing another method such as an organic electroluminescent (EL) display. The touch panel 28b is, for example, an electrostatic capacitance type panel, but is not limited thereto, and may be another type of panel, such as an electromagnetic induction type, a resistance film type, and an infrared type. Furthermore, the operation display section 28 includes, in addition to the display 28a, an appropriate light emitter, such as a light emitting diode (LED), not shown. The operation display section 28 further includes, in addition to the touch panel 28b, an appropriate hardware switch, not shown, such as a push button switch.

Here, the multifunction peripheral 10 of the first embodiment has the office direct print function that may accept an input of application data generated by predetermined application software and execute a print process based on the application data. According to this office direct print function, a print process based on application data generated by predetermined application software can be directly executed without using an external device, such as a personal computer. Furthermore, in recent years, the office direct print function according to the first embodiment may support not only application data generated by predetermined application software but also application data generated by compatible application software that is compatible with the predetermined application software. However, for application data generated by the compatible application software, the same font as that included in the application data generated by compatible application software may not be available in the multifunction peripheral 10, in which case the font in question is substituted.

Figure 2:
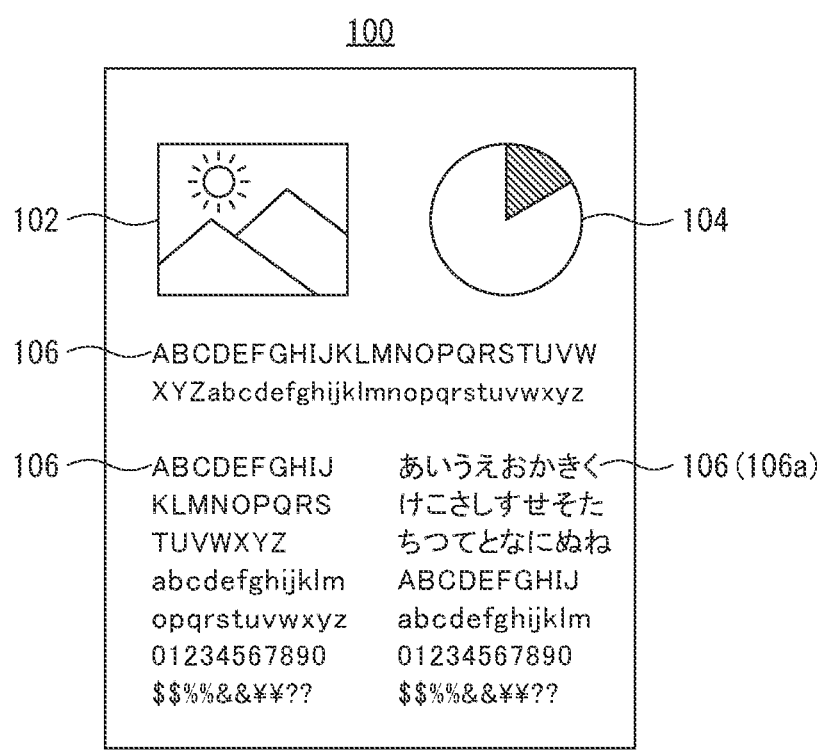
FIG. 2 is a diagram illustrating an example of an output image expected by application data provided for a print process to be performed by an office direct print function according to the first embodiment.

Specifically, it is assumed that a document file generated by certain word processing software serving as compatible application software is data expecting an output image (printed matter) 100 shown in FIG. 2. Note that the output image 100 shown in FIG. 2 includes, as its components, a certain photograph 102 and a certain figure (graph) 104. The output image 100 further includes a plurality of certain character strings 106, 106 . . . , as objects. The character strings 106, 106 . . . , include hiragana strings 106a.

It is assumed that a document file expecting the output image 100 shown in FIG. 2 is provided for the print process to be performed by the office direct print function according to the first embodiment. The application data provided for the print process by the office direct print function, including the document file referred to herein, is imported from an external storage medium 50, for example. Furthermore, application data provided for the print process to be performed by the office direct print function may also be imported from a certain server, such as a shared server or a cloud server, which is connected to the aforementioned communication network.

Figure 3:
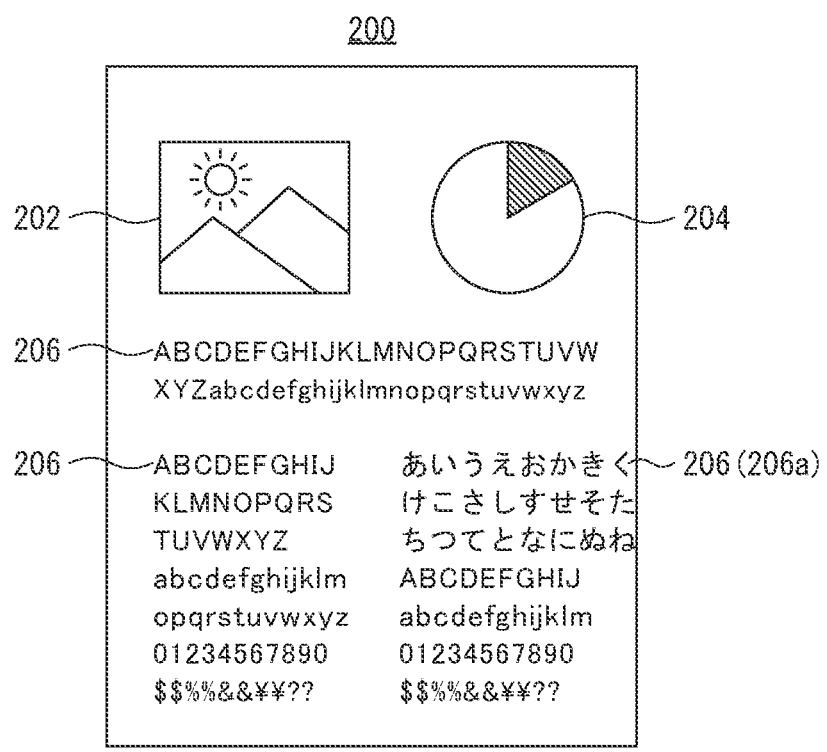
FIG. 3 is a diagram illustrating an example of an actual output image based on the application data provided for the print process to be performed by the office direct print function according to the first embodiment.

When a document file that expects the output image 100 shown in FIG. 2 is subjected to the print process by the office direct print function as described above, an output image 200 shown in FIG. 3, for example, may be obtained. This sort of actual output image 200 shown in FIG. 3 includes a photograph 202, a graphic 204, and a plurality of character strings 206, 206, . . . similar to those in the sort of desired output image 100 shown in FIG. 2. However, in the actual output image 200 shown in FIG. 3, some character strings, e.g., hiragana character strings 206a, are substituted with a font different from that of the hiragana character strings 106a included in the desired output image 100 shown in FIG. 2. Note that FIG. 3 shows an example in which, in the actual output image 200, portions (right side edges) of the character strings 206a are likely to protrude from the output image 200 (print range) due to an increase in spacing between characters of each of the character strings 206a based on the substituted font.

Figure 4:
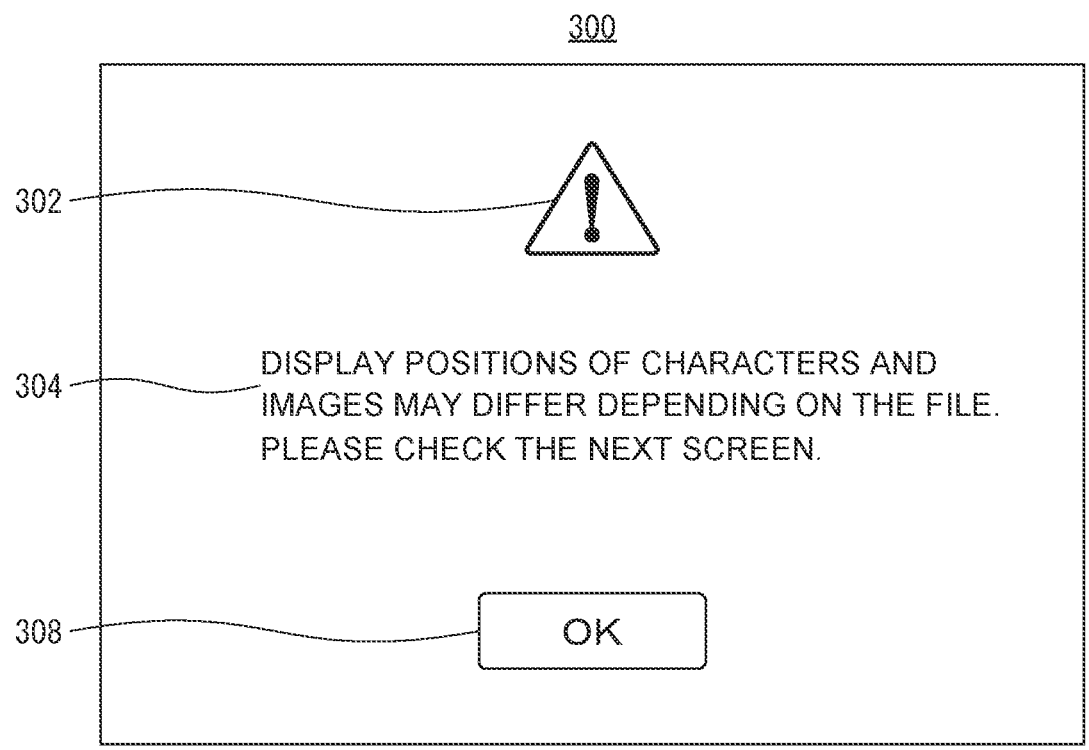
FIG. 4 is a diagram illustrating a caution message screen according to the first embodiment.

When the font is substituted in this way, that is, when a state of the actual output image 200 may be different from that of the desired output image 100, in the first embodiment, a caution message screen 300 is displayed on the display 28a as shown in FIG. 4 before the print process is executed. This caution message screen 300 is, for example, a modal dialog.

In the caution message screen 300, for example, a certain caution mark 302 with an exclamation mark (!) is placed in a center of an upper portion thereof. Then, below the caution mark 302, a certain character string 304 including content to inform the user that display positions and the like of characters and images may be different from desired ones (original) depending on a file provided for the print process to be executed, and that details thereof can be checked on a next screen (preview screen 400). In other words, the character string 304 includes an indication that some or all of the fonts is being substituted in the print process to be performed. Furthermore, an "OK" key 308 is disposed below the character string 304, that is, at a bottom of the caution message screen 300. The "OK" key 308 is an operation key to be operated by a user who has recognized the content of the caution message screen 300, in particular, the content represented by the character string 304.

With the caution message screen 300 displayed as described above, the user can recognize that display positions of characters and images may differ from desired positions depending on the file provided for the print process, and that details of the differences can be confirmed on the next screen. When the "OK" key 308 is operated (pressed) by the user, the caution message screen 300 disappears. A preview screen 400, as shown in FIG. 5, is then displayed on the display 28a.

Figure 5:
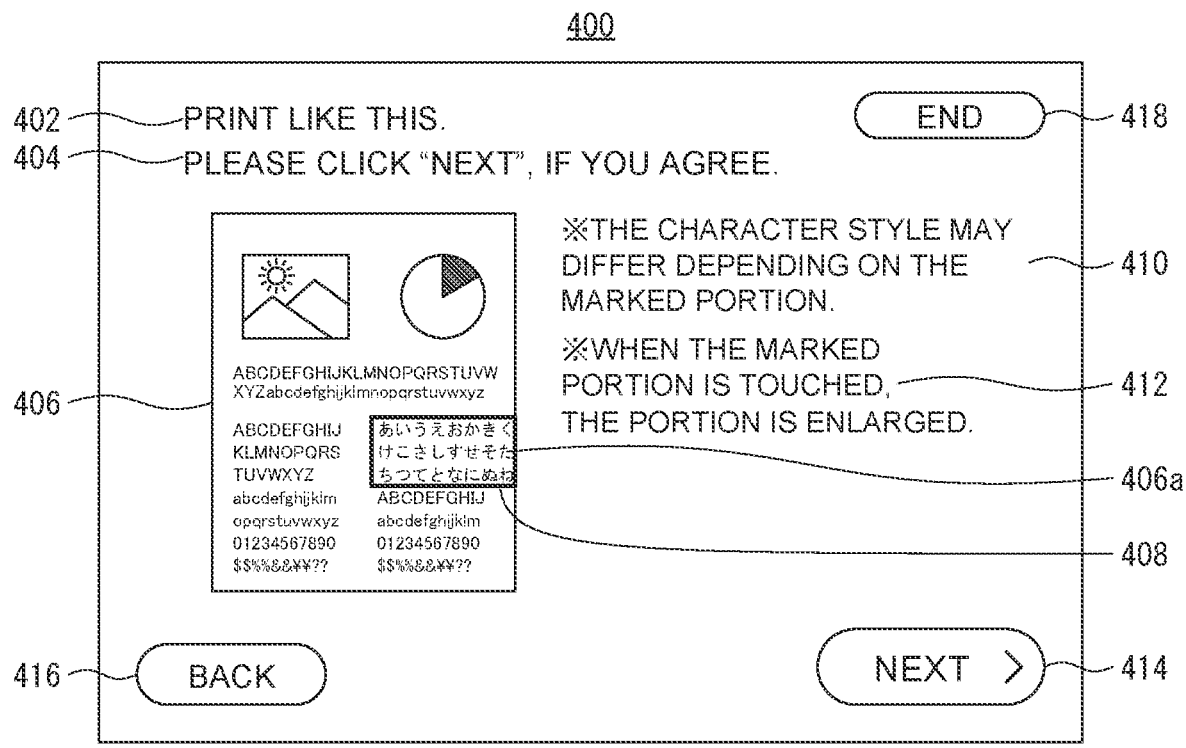
FIG. 5 is a diagram illustrating an example of a preview screen according to the first embodiment.

In the preview screen 400 shown in FIG. 5, for example, two character strings 402 and 404 are vertically arranged in two lines at a left-aligned position in an upper portion in the preview screen 400. The upper character string 402 includes content of a message for the user indicating that the print process to be performed hereafter results in the output image 200 (see FIG. 3) as represented by a preview image 406 described below. The lower character string 404 includes content to prompt the user to operate a "Next" key 414 described below, when the user agrees (if there is no obstacle) to obtain the output image 200 represented by the preview image 406. Furthermore, the preview image 406 is positioned below the character strings 402 and 404, that is, at a position approximately the left of the center in the preview screen 400.

The preview image 406 is a size-reduced image of an image expected as the output image 200 and is positioned based on preview image data generated by the image processing section 14 described above. In addition, a portion of the preview image 406 corresponding to a font substitution, that is, a portion where the hiragana character strings 406a are positioned, is appropriately marked by a rectangular frame 408, for example, attached to enclose the character strings 406a. Note that, although it is not clear from FIG. 5, the frame 408 is attached in a dynamic manner, for example, in a blinking manner.

In addition, a character string 410 is positioned near the preview image 406, for example, on a right side of an upper portion of the preview image 406. This character string 410 includes content of a message for the user indicating that, in a portion surrounded by the frame 408 (mark) in the preview image 406, that is, in a portion corresponding to the portion surrounded by the frame 408 in the output image 200, a character style or the like may differ. In addition, another character string 412 is positioned below the character string 410. The character string 412 includes content of a message for the user indicating that when the portion surrounded by the frame 408 in the preview image 406 is touched (pressed), the portion surrounded by the frame 408 is enlarged. That is, the preview image 406 functions as an operator to receive an operation for enlarging the portion enclosed by the frame 408 in the preview image 406.

A "Next" key 414 is disposed below the character string 412 or near a lower right corner of the preview screen 400. The "Next" key 414 is an operation key for proceeding to the next step required to execute the print process. Furthermore, a "Back" key 416 is disposed near a lower left corner of the preview screen 400. The "Back" key 416 is an operation key for returning to a state in which a previous screen, for example, a data import screen for selecting and importing application data to be used for the print process from a suitable data source, such as an external storage medium 50, is displayed on the display 28a. Furthermore, an "End" key 418 is disposed near an upper right corner of the preview screen 400. The "End" key 418 is an operation key for skipping execution of the print process or for terminating use of the office direct print function.

With the preview screen 400 being displayed as described above, the user can recognize the output image 200 to be obtained before the print process is executed with reference to the preview image 406 in particular. Here, for example, when the user agrees that the output image 200 as represented by the preview image 406 is obtained, the user can proceed to the next step required for executing the print process by operating the "Next" key 414. In this case, instead of the preview screen 400, a certain operation screen, not shown, is displayed on the display 28a for proceeding to the next step.

On the other hand, when the "Back" key 416 is operated, for example, the aforementioned data import screen, which is the screen before the preview screen 400 is displayed, is displayed on the display 28a instead of the preview screen 400. This allows the user to perform the previous operations again as appropriate, including selecting and importing different application data from the appropriate data source, such as the external storage medium 50.

Furthermore, when the "End" key 418 is operated, the print process is not executed. In this case, instead of the preview screen 400, an end message screen indicating that the use of the office direct print function is to be terminated is displayed on the display 28a for a certain period of time (approximately several seconds). Thereafter, a home screen (also referred to as a "portal screen"), not shown, is displayed on the display 28a.

Figure 6:
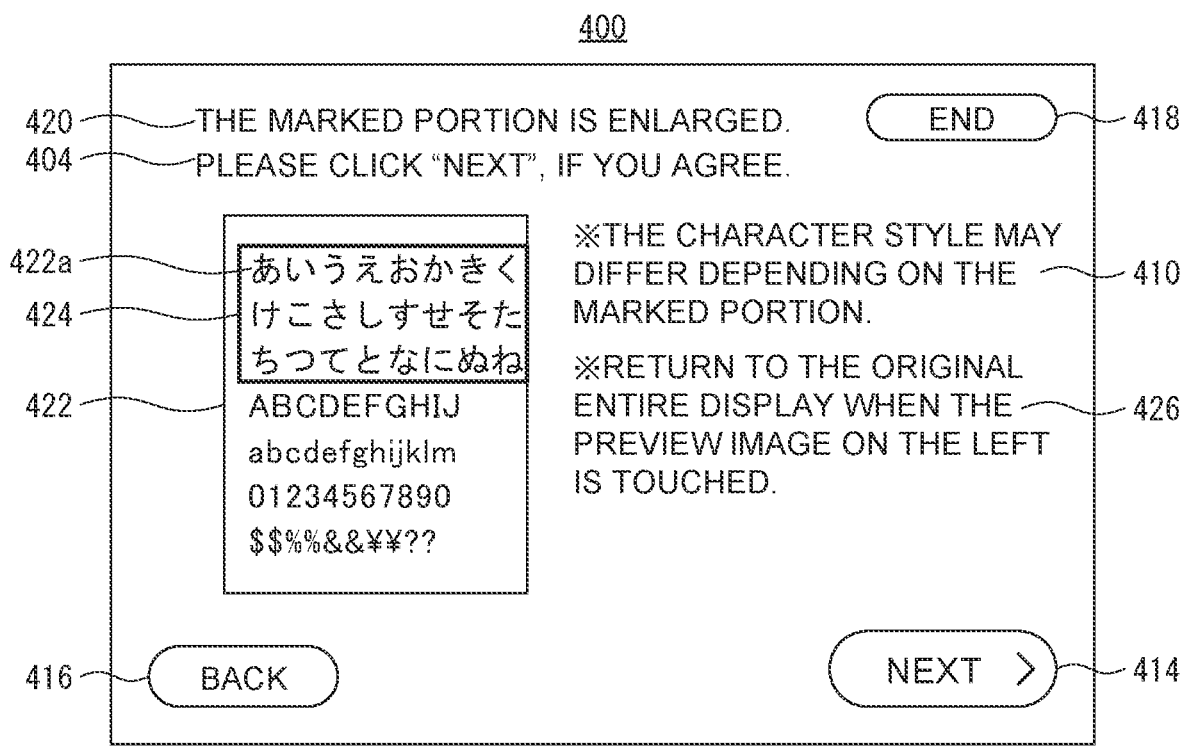
FIG. 6 is a diagram illustrating an example of another mode of a preview screen according to the first embodiment.

Furthermore, when the portion surrounded by the frame 408 in the preview image 406 is touched, the portion surrounded by the frame 408 is enlarged and displayed, and the preview screen 400 changes to a state shown in FIG. 6. Specifically, when any portion of the preview image 406, not limited to the portion surrounded by the frame 408 in the preview image 406, is touched, the preview screen 400 changes to the state shown in FIG. 6. That is, not only the portion surrounded by the frame 408 in the preview image 406, but the entire preview image 406 functions as an operator.

In the preview screen 400 shown in FIG. 6, another character string 420 is arranged in place of the character string 402 shown in FIG. 5. This character string 420 includes content indicating that the enlarged image 422 described below is an image in which a portion of a region including the portion enclosed by the frame 408 in the preview image 406 is enlarged.

Furthermore, in the preview screen 400 shown in FIG. 6, instead of the preview image 406 shown in FIG. 5, an enlarged image 422 obtained by enlarging a portion of the region including the portion surrounded by the frame 408 in the preview image 406 is disposed. Here, the disposed enlarged image 422 is obtained by enlarging a region of the lower right quarter in the preview image 406 including the portion surrounded by the frame 408 in the preview image 406. Also in the enlarged image 422, a rectangular frame 424 is attached to a portion where hiragana character strings 422a are arranged, that is, to a portion corresponding to the font substitution, so as to enclose the character strings 422a. Furthermore, although it is not clear from FIG. 6, a frame 424 is attached in a dynamic manner, for example, in a blinking manner.

Additionally, in the preview screen 400 shown in FIG. 6, another character string 426 is arranged in place of the character string 412 shown in FIG. 5. The character string 426 includes content indicating that, when an arbitrary portion in the enlarged image 422 is touched, the preview image 406 is displayed again instead of the enlarged image 422, that is, the preview screen 400 returns to the original state shown in FIG. 5. In other words, the enlarged image 422 functions as an operator to receive an operation to restore the preview screen 400 to the original state shown in FIG. 5.

From the preview screen 400 shown in FIG. 6, and in particular from the enlarged image 422, the user can see in greater detail the font substitution portion in the output image 200. Also in the preview screen 400 shown in FIG. 6, when the "Next" key 414 is operated, for example, an appropriate operation screen not shown is displayed on the display 28a for proceeding to the next step instead of the preview screen 400. Furthermore, when the "Back" key 416 is operated in the preview screen 400 shown in FIG. 6, for example, the data import screen is displayed on the display 28a instead of the preview screen 400. Furthermore, when the "End" key 418 is operated, the above-described end message screen is displayed on the display 28a for a certain period of time instead of the preview screen 400, and then the above-described home screen is displayed on the display 28a. Moreover, in the preview screen 400 shown in FIG. 6, when an arbitrary portion in the enlarged image 422 is touched, the preview screen 400 returns to the original state shown in FIG. 5.

Note that, in the case where the font is not substituted in the application data provided for the print process performed by the office direct print function, the caution message screen 300 and the preview screen 400 are not displayed. In this case, as is the case where the "Next" key 414 in the preview screen 400 is operated, an operation screen, not shown, is displayed to proceed to the next step required for executing the print process. Examples of the case where the font substitution is not performed include a case where the application data is generated by predetermined application software that is not compatible application software. The examples further include a case where the application data is a so-called environment-independent file which does not depend on a handling environment, such as a pdf file. The examples further include a case where, although the application data is generated by compatible application software, all fonts included in the application data are supported by the multifunction peripheral 10. In addition, the examples naturally include a case where the application data does not include any font.

Figure 7:
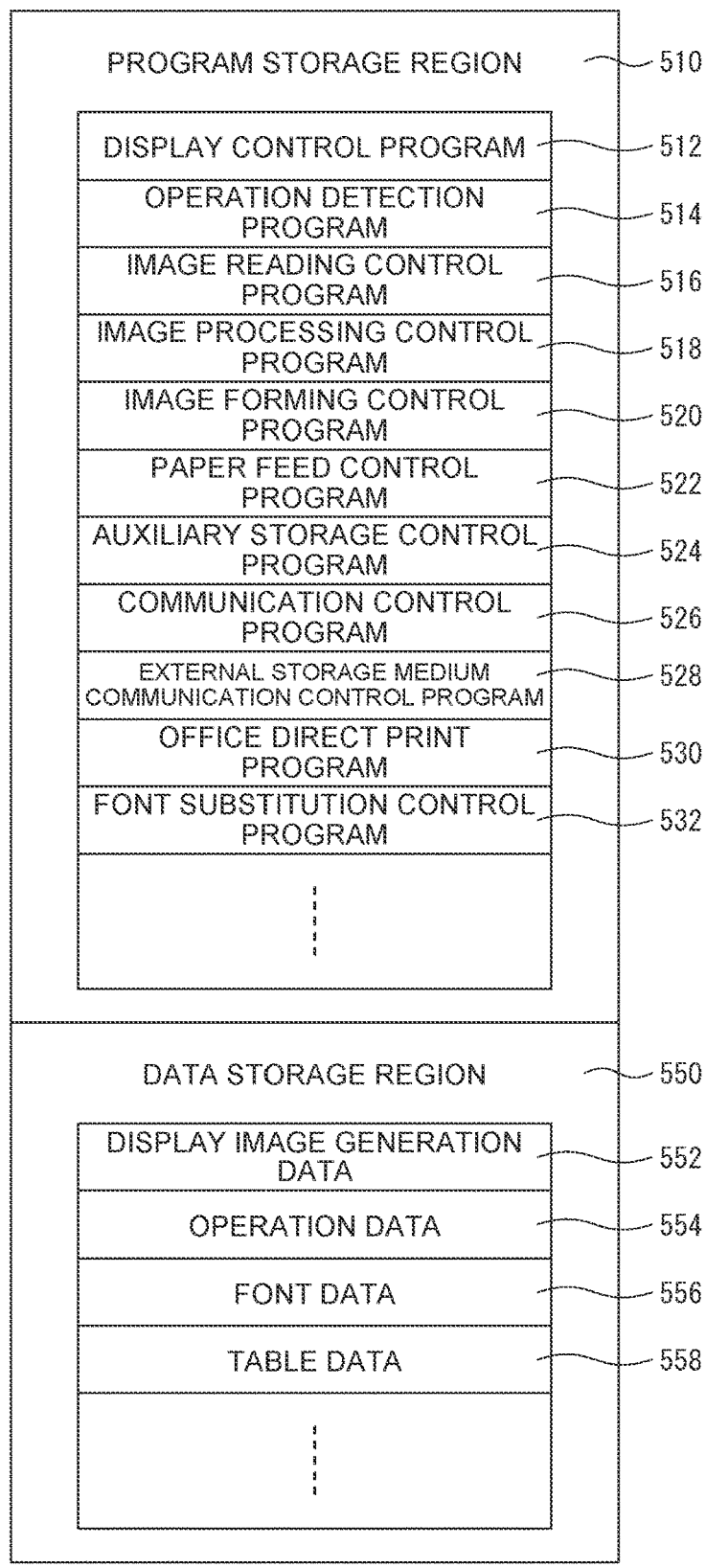
FIG. 7 is a diagram illustrating a memory map conceptually representing a configuration in a random access memory (RAM) of a main storage section according to the first embodiment.

Here, FIG. 7 shows a memory map 500 conceptually representing a configuration in the RAM of the main storage section 20b.

As illustrated in the memory map 500, the RAM includes a program storage region 510 and a data storage region 550. In the program storage region 510, the control programs described above are stored. Specifically, the control programs include a display control program 512, an operation detection program 514, an image reading control program 516, an image processing control program 518, an image forming control program 520, and a paper feed control program 522. The control programs further include an auxiliary storage control program 524, a communication control program 526, and an external storage medium communication control program 528. The control programs further include an office direct print program (also referred to as an "office direct lettering program") 530 and a font substitution control program 532.

The display control program 512 generates display screen data required for displaying various screens including the home screen described above on the display 28a. The operation detection program 514 detects a state of operation on the touch panel 28*b*. The image reading control program 516 controls the image reading section 12. The image processing control program 518 controls the image processing section 14. The image forming control program 520 controls the image forming section 16. The paper feed control program 522 controls the paper feed section 18. The auxiliary storage control program 524 controls the auxiliary storage section 22. The communication control program 526 controls the communication section 24. The external storage medium communication control program 528 controls the external storage medium communication section 26. The office direct print program 530 realizes the office direct print function. The font substitution control program 532 causes the CPU 20*a* to execute a font substitution control task described below.

Meanwhile, various types of data are stored in the data storage region 550. Examples of the various types of data include display image generation data 552, operation data 554, font data 556, and table data 558.

The display image generation data 552 is polygon data and texture data to be used to generate display screen data based on the display control program 512 described above. The operation data 554 represents a state of operation on the touch panel 28*b*, and specifically represents time series data representing a position (coordinate) of a touch on the touch panel 28*b*. The font data 556 is data of a font, and is specifically data of a plurality of types of Japanese font and alphanumeric fonts. The table data 558 includes data of various tables, and particularly includes an alternative font table 558*a* shown in FIG. 8 and a font substitution implementation table 558*b* shown in FIG. 9.

Figure 8:
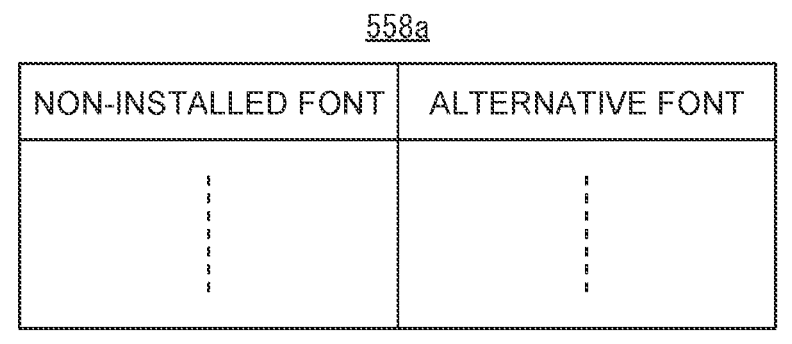

The alternative font table 558*a* shown in FIG. 8 includes the correspondence between fonts that are not included in the font data 556, that is, the fonts that are not supported by the multifunction peripheral 10, and fonts of substitution that are included in the font data 556. In other words, when the application data to be used for the print process performed by the office direct print function includes a non-installed font, the correspondence between the non-installed font and one of the fonts included in the font data 556 which serves as a substitution of the non-installed font is described in the alternative font table 558*a*.

Then the font substitution implementation table 558*b* shown in FIG. 9 stores, when a font in the application data provided for the print process performed by the office direct print function is to be substituted, detailed information thereof. For example, when a font included in the application data is to be substituted, the relationship between the so-called original font to be substituted and an alternative font which is a substitution of the original font is stored in the font substitution implementation table 558*b* in a state in which the original font and the alternative font are associated with each other. In addition, a substitution position of the font, or specifically a leading position (coordinate) of the font, is stored in the font substitution implementation table 558*b*.

Figure 10:
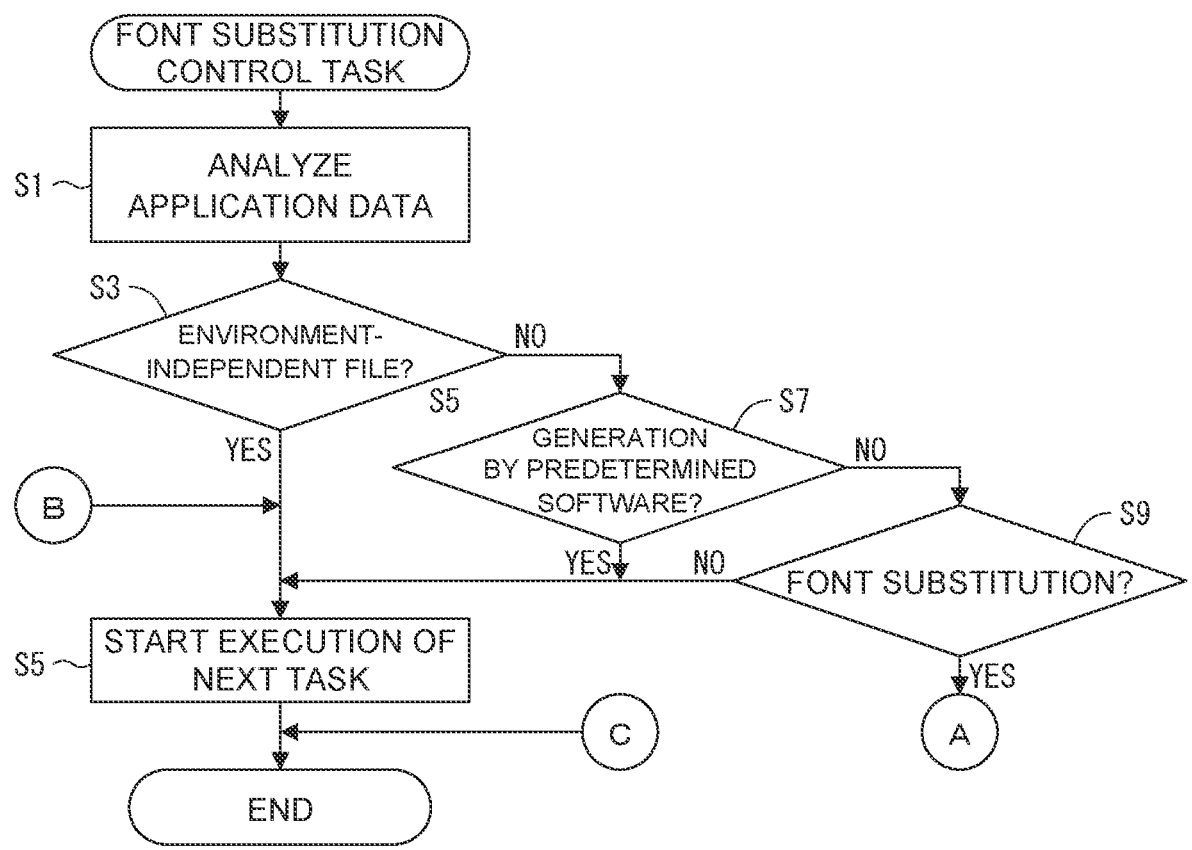
FIG. 10 is a flowchart of a flow of a portion of a font substitution control task according to the first embodiment.
Figure 11:
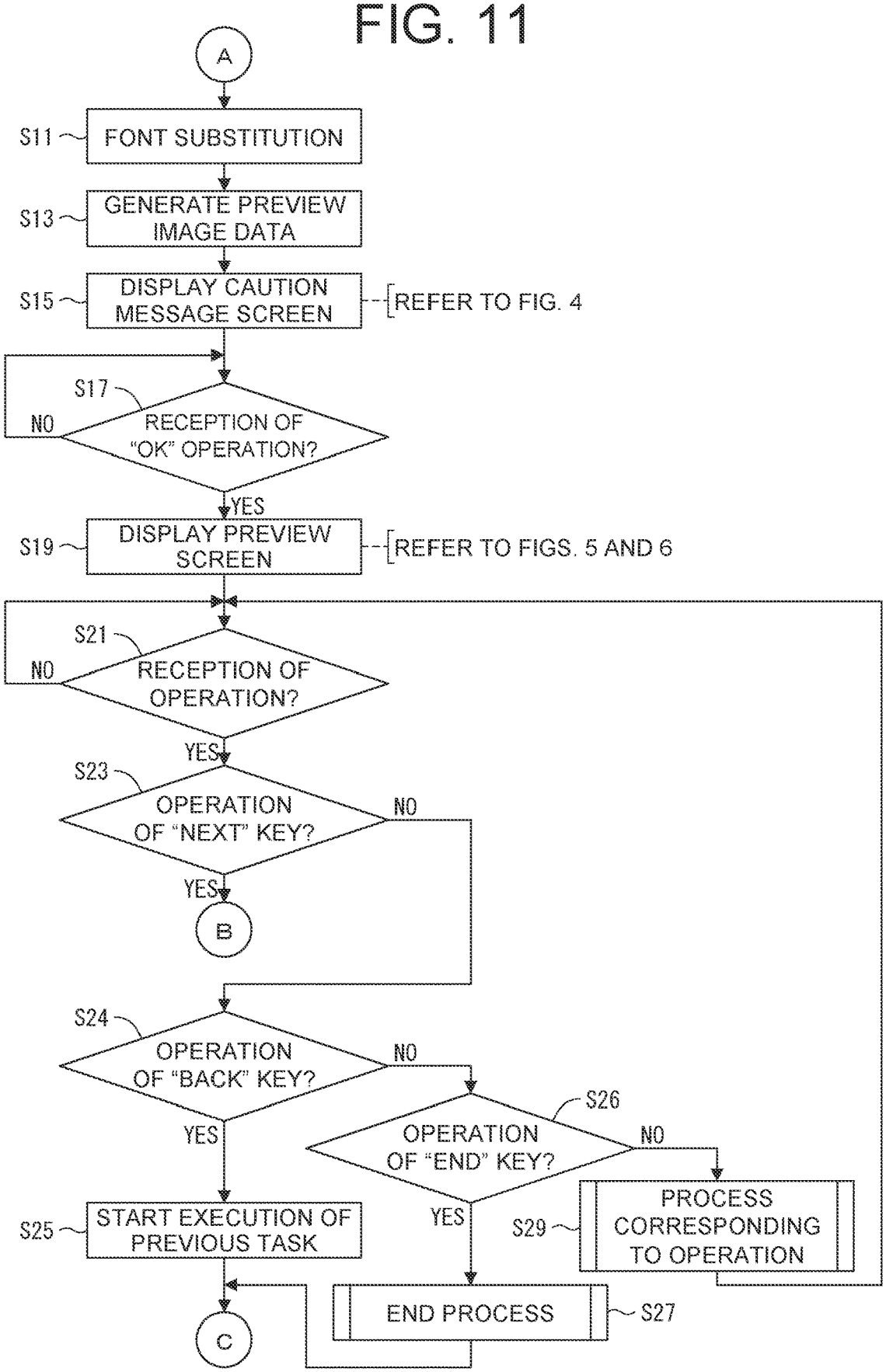
FIG. 11 is a flowchart of a flow of the rest of the font substitution control task according to the first embodiment.

As described above, the CPU 20*a* operates in accordance with the control programs, and in particular, executes the font substitution control task upon execution of the print process by the office direct print function. A flow of the font substitution control task is shown in FIGS. 10 and 11. Note that the font substitution control task is executed in accordance with the font substitution control program 532 described above. The font substitution control task is executed in response to supply of the application data provided for the print process to be performed by the office direct print function from an appropriate data source, such as the external storage medium 50.

According to the font substitution control task, the CPU 20*a* first analyzes, in step S1, the application data provided for the print process to be performed by the office direct print function so as to analyze attribute information, such as an extension of the application data. Then, the CPU 20*a* advances the process to step S3.

In step S3, the CPU 20*a* determines, based on a result of the analysis performed in step S1, whether the application data provided for the print process is an environment-independent file, such as a pdf file. Here, for example, when the application data is an environment-independent file (S3: YES), the CPU 20*a* advances the process to step S5. On the other hand, when the application data is not an environment-independent file (S3: NO), the CPU 20*a* advances the process to step S7 described below.

In step S5, the CPU 20*a* starts execution of the next task required for executing the print process based on the application data. This causes display of an operation screen, not shown, on the display 28*a* for proceeding to the next procedure described above. The CPU 20*a* thus terminates the font substitution control task.

On the other hand, after the CPU 20*a* advances the process from step S3 to step S7, the CPU 20*a* determines, in step S7, whether the application data has been generated by the predetermined application software. The determination in step S7 is also made based on the result of the analysis performed in step S1. When it is determined that the application data has been generated by the predetermined application software in step S7, for example, (S7: YES), the CPU 20*a* advances the process to step S5. On the other hand, when the application data is not generated by the predetermined application software, that is, when the application data is generated by compatible application software (ST NO), the CPU 20*a* advances the process to step S9.

In step S9, the CPU 20*a* determines whether the font is required to be substituted, or specifically, whether the application data includes the aforementioned non-installed font. The determination in step S9 is also made based on the result of the analysis performed in step S1. Here, for example, when the font is not required to be substituted, that is, when the application data does not include a non-installed font (S9: NO), the CPU 20*a* advances the process to step S5. On the other hand, when the font is required to be substituted, that is, when the application data includes a non-installed font (S9: YES), the CPU 20*a* advances the process to step S11. Note that, also in a case where the application data does not include any font, the CPU 20*a* naturally determines that the font is not required to be substituted and advances the process to step S5.

In step S11, the CPU 20*a* substitutes the non-installed font included in the application data with an alternative font. In this operation, the CPU 20*a* refers to the alternative font table 558*a*. In addition, the CPU 20*a* stores information on the font substitution in the font substitution implementation table 558*b*. Then, the CPU 20*a* advances the process to step S13.

In step S13, the CPU 20*a* generates preview image data based on post-substitution data obtained after the font is substituted, or technically, instructs the image processing section 14 to generate preview image data. Accordingly, the image processing section 14 performs image processing to generate preview image data, including rasterization. After executing the process in step S13, the CPU 20*a* advances the process to step S15.

In step S15, the CPU 20a displays the caution message screen 300 on the display 28a. Then, the CPU 20a advances the process to step S17. Note that step S15 may not be provided immediately after step S13, but may be provided immediately before step S13 or immediately before step S11, for example.

In step S17, the CPU 20a waits for a reception of an operation on the "OK" key 308 in the caution message screen 300 (S17: NO). When the "OK" key 308 receives an operation (S17: YES), the CPU 20a advances the process to step S19.

In step S19, the CPU 20a deletes the caution message screen 300 before displaying the preview screen 400 on the display 28a, or technically, displaying the preview screen 400 including the preview image 406 shown in FIG. 5 on the display 28a. Then, the CPU 20a advances the process to step S21.

In step S21, the CPU 20a waits for an operation performed on the preview screen 400 (S21: NO). When the preview screen 400 accepts an operation (S21: YES), the CPU 20a advances the process to step S23.

In step S23, the CPU 20a determines whether the operation accepted in step S21 is performed on the "Next" key 414 in the preview screen 400. Here, when the operation accepted in step S21 is an operation performed on the "Next" key 414 (S23:YES), the CPU 20a advances the process to step S5 described above. Meanwhile, when the operation accepted in step S21 is not an operation performed on the "Next" key 414 (S23: NO), the CPU 20a advances the process to step S24.

In step S24, the CPU 20a determines whether the operation accepted in step S21 is performed on the "Back" key 416 in the preview screen 400. Here, when the operation accepted in step S21 is performed on the "Back" key 416 (S24: YES), the CPU 20a advances the process to step S25. On the other hand, when the operation accepted in step S21 is not performed on the "Back" key 416 (S24: NO), the CPU 20a advances the process to step S26.

In step S25, the CPU 20a starts execution of a task to be performed before the font substitution control task to return to the state in which the aforementioned data import screen is displayed on the display 28a. As a result, the data import screen is again displayed on the display 28a instead of the preview screen 400. The CPU 20a thus terminates the font substitution control task.

On the other hand, when the CPU 20a advances the process from step S24 to step S26, the CPU 20a determines whether the operation accepted in step S21 is performed on the "End" key 418 in the preview screen 400 in step S26. Here, when the operation accepted in step S21 is performed on the "End" key 418 (S26:YES), the CPU 20a advances the process to step S27. On the other hand, when the operation accepted in step S21 is not performed on the "End" key 418 (S26: NO), the CPU 20a advances the process to step S29.

In step S27, the CPU 20a executes a process for terminating the office direct print function. The termination process in step S27 includes a process of displaying the end message screen described above on the display 28a for a certain period of time instead of the preview screen 400, and then displaying the home screen on the display 28a. The CPU 20a thus terminates the font substitution control task.

Meanwhile, when advancing the process from step S26 to step S29, the CPU 20a executes, in step S29, a process that corresponds to the operation accepted in step S21. Examples of the process performed in step S29 include a process performed in response to a touch on an arbitrary position of the preview image 406 shown in FIG. 5 included in the preview screen 400. As described above, when an arbitrary position of the preview image 406 is touched, the preview screen 400 changes to the state shown in FIG. 6. In the preview screen 400 including the enlarged image 422 as shown in FIG. 6, when an arbitrary portion of the enlarged image 422 is touched, the preview screen 400 changes to the state shown in FIG. 5, and the process performed at this time also corresponds to the process in step S29. After executing the process in step S29, the CPU 20a returns the process to step S21.

As described above, according to the first embodiment, when a font is substituted in execution of a print process by the office direct print function, the caution message screen 300 is displayed on the display 28a prior to the execution of the print process. That is, the user may recognize, before the print process is executed, that the actual output image 200 may be different from the desired output image 100 due to the font substitution. Furthermore, the preview screen 400 including the preview image 406 may be displayed on the display 28a, and in addition, the enlarged image 422 of the region including the font substitution corresponding portion in the preview image 406 may be displayed. Specifically, the user can intuitively recognize the output image 200. This is extremely advantageous for the multifunction peripheral 10 in which it is highly likely that a font is substituted by the office direct print function.

The multifunction peripheral 10 of the first embodiment may be installed in a public space, such as a convenience store, on the assumption that the multifunction peripheral 10 is used by an unspecified number of users. In such an environment, in particular, the application data provided for the print process to be performed by the office direct print function may be generated by various compatible application software, and accordingly, fonts are highly likely to be substituted. In such an environment, the first embodiment is extremely effective.

In the first embodiment, the CPU 20a that executes the font substitution control task, and in particular, the CPU 20a that executes the process in step S1 in the font substitution control task, is an example of an analyzer of the present disclosure. Furthermore, the CPU 20a that executes the processes in step S3, step S7, and step S9 is an example of a determiner of the present disclosure. Moreover, the CPU 20a that executes the process in step S15 constitutes, in cooperation with the display 28a, an example of a caution information outputter according to the present disclosure. Moreover, the CPU 20a that executes the process in step S19 constitutes, in cooperation with the display 28a, an example of a preview image display according to the present disclosure.

Furthermore, the caution message screen 300 in the first embodiment is an example of caution information according to the present disclosure. The caution information may be output in an auditory form of sound instead of or in addition to a visual form of the caution message screen 300.

The frame 408 attached to the preview image 406 in the preview screen 400 shown in FIG. 5 is an example of first marking of the present disclosure. The first marking is not limited to the frame 408, but may be other types of marking, such as appropriate patterns or colors. Also in this case, other types of marking, such as patterns and colors, may be attached in a dynamic manner, for example, in a blinking manner.

Furthermore, the enlarged image 422 in the preview screen 400 shown in FIG. 6 is an example of a first enlarged image according to the present disclosure. The region represented by the enlarged image 422, that is, the region of the lower right quarter in the preview image 406 shown in FIG. 5, is an example of a first region according to the present disclosure. Furthermore, although one of the preview image 406 and the enlarged image 422 is, as it were, selectively displayed, the preview image 406 and the enlarged image 422 may be simultaneously displayed, that is, may be arranged side by side on a common preview screen.

Second Embodiment

Next, a second embodiment of the present disclosure will be described.

As described above, in the first embodiment, especially in the preview screen 400 including the preview image 406 as shown in FIG. 5, the frame 408 is attached, as an example of the first marking, to the font substitution corresponding portion included in the preview image 406. It is assumed here that so-called second marking different from the frame 408, is originally attached to a portion corresponding to the frame 408 in the preview image 406, that is, the second marking is attached based on the application data. In this case, it is difficult to determine whether the marking being assigned to the preview image 406 is the second marking or the frame 408 serving as the first marking. Accordingly, it is difficult to intuitively recognize a portion where a font has been substituted. To resolve such inconveniences, in the second embodiment, when second marking is originally attached to a font substitution corresponding portion in a preview image 406, first marking of a different type from the second marking is attached.

Therefore, in the second embodiment, a marking rank table 558c is provided as shown in FIG. 12 and is specifically incorporated into the table data 558 described above in detail. In the marking rank table 558c, a plurality of marking forms are specified as candidates for the second marking. In addition, priority levels are assigned to the individual marking forms. Note that FIG. 12 shows an example in which three marking forms, that is, "frame", "coloring" and "underline", are specified in order of priority. The priority levels of the three marking forms may be arbitrarily changed. The number of marking forms and types of marking form may also be arbitrarily specified.

Then, in the second embodiment, when the second marking is originally attached to a font substitution corresponding portion in the preview image 406, a different type of marking form from the second marking that has the highest priority is adopted as the first marking. For example, when the second marking is a frame, "Coloring", which is the marking form with the next highest priority after the frame, is adopted as the first marking. As a result, an appropriate color is attached as the first marking to the font substitution corresponding portion in the preview image 406. Furthermore, when the second marking is coloring, for example, "Frame" which is the marking form with the highest priority is adopted as the first marking. As a result, a frame 408 is attached to the font substitution corresponding portion in the preview image 406. Furthermore, when two types of marking, that is, a frame and coloring, have been attached as the second marking, 'underline' is adopted as the first marking. As a result, an underline is attached to the font substitution corresponding portion in the preview image 406. Also in the preview screen 400 including the enlarged image 422 shown in FIG. 6, the same type of marking as the first marking attached to the preview image 406 is attached to the font substitution corresponding portion in the enlarged image 422.

Figure 13:
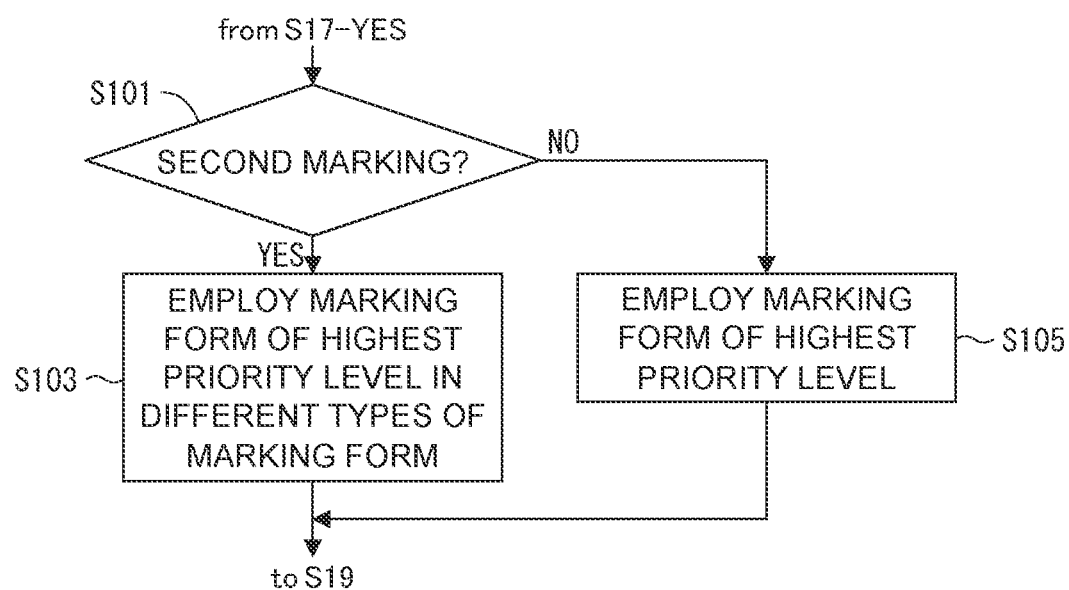
FIG. 13 is a flowchart of a flow of a portion of a font substitution control task according to the second embodiment.

Although a CPU 20a executes a font substitution control task also in the second embodiment, a process from step S101 to step S105 shown in FIG. 13 is provided between step S17 (YES) and step S19 in the font substitution control task in the second embodiment. Specifically, when an operation of an "OK" key 308 in a caution message screen 300 is received in step S17 (S17: YES), the CPU 20a advances the process to step S101.

In step S101, the CPU 20a determines whether the second marking is attached to the font substitution portion estimated using preview image data. Here, for example, when the second marking is attached (S101: YES), the CPU 20a advances the process to step S103. On the other hand, when the second marking is not attached (S101: NO), the CPU 20a advances the process to step S105 described below.

In step S103, the CPU 20a adopts, with reference to the marking rank table 558c, a marking form of a different type from the second marking that has the highest priority as the first marking. Then, the CPU 20a advances the process to step S19 to display the preview screen 400 including the preview image 406 shown in FIG. 5 on the display 28a. In this case, a result of the adoption in step S103 is reflected in the preview screen 400 displayed on the display 28a in step S19.

On the other hand, when the CPU 20a proceeds from step S101 to step S105, the CPU 20a adopts a marking method having the first priority, that is, "Frame", as the first marking in step S105. Then, the CPU 20a advances the process to step S19. In this case, in the preview screen 400 displayed on the display 28a in step S19, a result of the adoption obtained in step S105 is reflected, that is, the frame 408 is attached as the first marking.

As described above, according to the second embodiment, when the second marking is originally attached to the font substitution corresponding portion in the preview image 406, the first marking of a different type from the second marking is attached. Therefore, even when the second marking is originally attached to the font substitution corresponding portion in the preview image 406, the font substitution corresponding portion can be intuitively recognized.

Third Embodiment

Next, a third embodiment of the present disclosure will be described.

Figure 14:
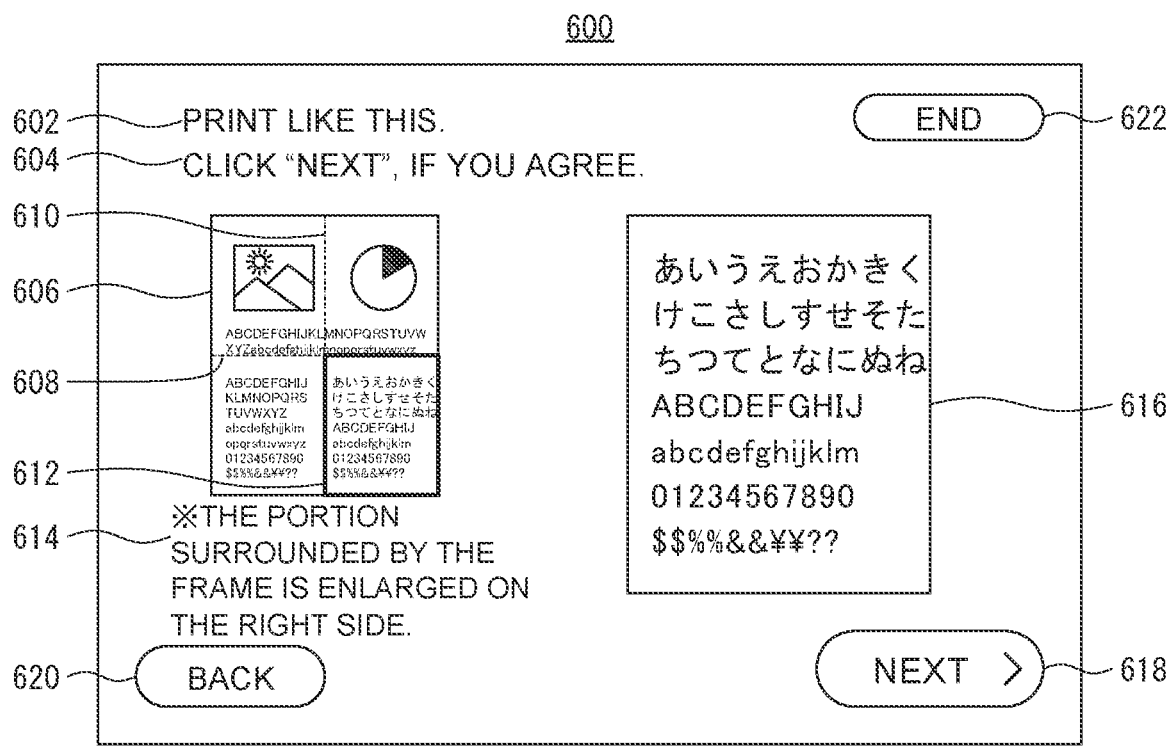
FIG. 14 is a diagram illustrating an example of a preview screen according to a third embodiment of the present disclosure.

In the third embodiment, instead of the preview screen 400 shown in FIGS. 5 and 6 according to the first embodiment (and the second embodiment), a preview screen 600 is displayed on a display 28a as shown in FIG. 14.

In the preview screen 600 shown in FIG. 14, for example, two character strings 602 and 604 similar to the character strings 402 and 404 in the preview screen 400 shown in FIG. 5 are arranged in upper and lower two lines at a position near the left in an upper portion of the screen. Then, a preview image 606 is positioned below the character strings 602 and 604, that is, at a position approximately the left of the center in the preview screen 600. The preview image 606 is slightly smaller than the preview image 406 included in the preview screen 400 shown in FIG. 5.

The preview image 606 has a straight vertical-division line 608 that bisects the preview image 606 into an upper region and a lower region, and a straight horizontal-division line 610 that bisects the preview image 606 into a left region and a right region. Specifically, the preview image 606 is divided into four regions, that is, an upper left region, an upper right region, a lower left region, and a lower right region, by the vertical-division line 608 and the horizontal-division line 610. The vertical-division line 608 and the horizontal-division line 610 are marked in a relatively inconspicuous manner, for example, as thin dashed lines, that is, in a manner that does not interfere with viewing the preview image 606.

Then, appropriate marking as third marking, such as a rectangular frame 612, is attached to one of the four regions of the preview image 606 divided into the four regions as described above. The frame 612 represents the possibility that, in a region marked with the frame 612, or more strictly in a region in an output image 200 corresponding to a region marked with the frame 612, an object, such as a character, may protrude from a print range due to font substitution. Specifically, the frame 612 is attached to a region including a protrusion corresponding portion in the preview image 606 corresponding to a portion where an object included in the output image 200 may protrude from a print portion. Note that FIG. 14 shows an example in which the frame 612 is attached to the lower right region in the preview image 606.

Furthermore, a character string 614 is positioned below the preview image 606. The character string 614 includes content of a message for a user indicating that the region with the frame 612 in the preview image 606 is displayed in an enlarged manner on a right side of the preview image 606. Then, the region marked with the frame 612 in the preview image 606 is displayed in the enlarged manner on the right side of the preview image 606, that is, an enlarged image 616 of the region marked with the frame 612 is displayed.

In the preview screen 600 shown in FIG. 14, a "Next" key 618 similar to the "Next" key 414 in the preview screen 400 shown in FIG. 5 (and FIG. 6) is also positioned near a lower right corner. In addition, a "Back" key 620 similar to the "Back" key 416 in the preview screen 400 shown in FIG. 5 is positioned near a lower left corner of the preview screen 600. Moreover, an "End" key 622 similar to the "End" key 418 in the preview screen 400 shown in FIG. 5 is positioned near an upper right corner of the preview screen 600.

According to the preview screen 600 illustrated in FIG. 14, the user can recognize an output image 200 to be obtained particularly with reference to the preview image 606 and the enlarged image 616 before the print process is executed. In addition, the user can intuitively recognize a portion where an object included in the output image 200 may protrude from a print range due to the font substitution.

Here, the region where an object included in the output image 200 may protrude from the print range due to the font substitution, or a degree of the possibility, depends on whether the substituted font corresponds to horizontal writing or vertical writing. For example, when the substituted font corresponds to horizontal writing, i.e., when the output image 200 is such an image as shown in FIG. 3 (including only horizontal character strings 206 as character strings), a lower right region, an upper right region, a lower left region, and an upper left region of the output image 200, in that order, are assumed to be regions where it is highly likely that an object protrudes from the print range. Accordingly, in the preview screen 600 shown in FIG. 14, the frame 612 is attached to the lower right region in the preview image 606 corresponding to the lower right region in the output image 200 where an object is most likely to protrude from the print range.

When the substituted font corresponds to horizontal writing and any object is not included in the lower right region in the output image 200, the frame 612 is not attached to the lower right region in the preview image 606 corresponding to the lower right region in the output image 200. In such a case, the frame 612 is attached to the upper right region in the preview image 606 corresponding to the upper right region in the output image 200 where the object is next likely to protrude from the print region. Furthermore, when any object is not included in the upper right region in the output image 200, the frame 612 is attached to the lower left region in the preview image 606 corresponding to the lower left region in the output image 200 where an object is next likely to protrude from the print region. Furthermore, when any object is not included in the lower left region in the output image 200, the frame 612 is attached to the upper left region in the preview image 606.

Figure 15:
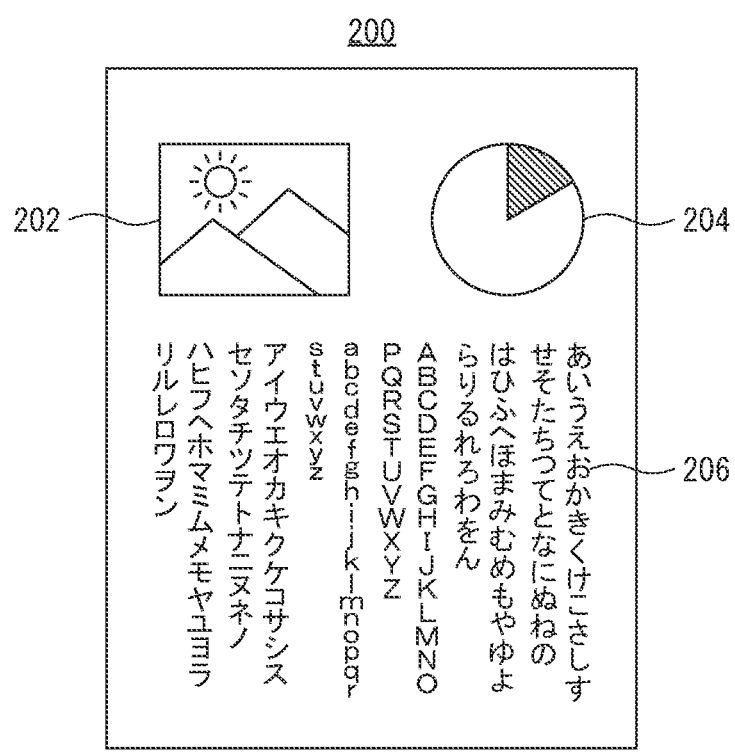
FIG. 15 is a diagram illustrating an example of an output image including character strings of vertical writing based on application data provided for a print process to be performed by an office direct print function according to the third embodiment.

On the other hand, when the substituted font corresponds to vertical writing, i.e., when the output image 200 is such an image as shown in FIG. 15 (including only vertical character strings 206 as character strings), a lower left region, a lower right region, an upper left region, and an upper right region of the output image 200, in this order, are assumed to be regions where it is highly likely that an object protrudes from a print range. Therefore, basically, the frame 612 is attached to the lower left region in the preview image 606 corresponding to the lower left region where it is most likely that an object included in the output image 200 protrudes from the print range.

When the substituted font corresponds to vertical writing and any object is not included in the lower left region in the output image 200, the frame 612 is not attached to the lower left region in the preview image 606 corresponding to the lower left region in the output image 200. In such a case, the frame 612 is attached to the lower right region in the preview image 606 corresponding to the lower right region in the output image 200 where an object is next likely to protrude from the print region. Furthermore, when any object is not included in the lower right region in the output image 200, the frame 612 is attached to the upper left region in the preview image 606 corresponding to the upper left region in the output image 200 where an object is next likely to protrude from the print region. Furthermore, when any object is not included in the upper left region in the output image 200, the frame 612 is attached to the upper right region in the preview image 606.

In this third embodiment, a horizontal-writing priority table 558d is provided as shown in FIG. 16, and is specifically incorporated into the table data 558 described above. In the horizontal-writing priority table 558d, priority levels are set for the four regions in the preview image 606. The priority levels of the individual regions may be arbitrarily changed. The number of regions and a division state (shape) may also be arbitrarily set.

In addition, in the third embodiment, a vertical-writing priority table 558e is provided as shown in FIG. 17, and is specifically incorporated into the table data 558 in detail. Also in the vertical-writing priority table 558e, priority levels are set for the four regions in the preview image 606. The priority levels of the individual regions may also be arbitrarily changed. Furthermore, the number of regions and a shape may also be arbitrarily set.

Figure 18:
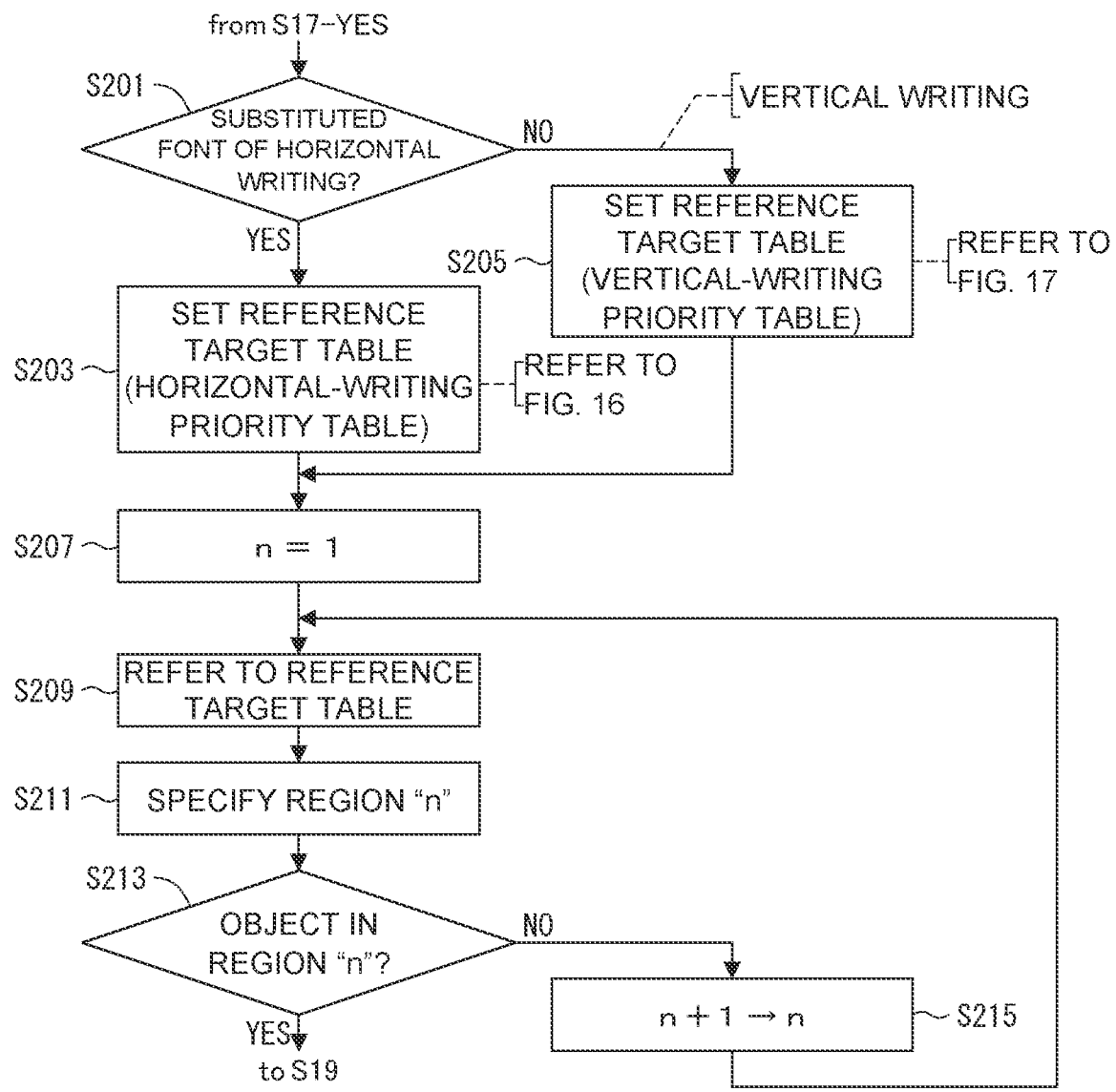
FIG. 18 is a flowchart of a flow of a portion of a font substitution control task according to the third embodiment.

With this configuration, although the CPU 20a executes a font substitution control task also in the third embodiment, a process from step S201 to step S215 as shown in FIG. 18 is provided between step S17 (YES) and step S19 in the font substitution control task in the third embodiment. Specifically, when an operation of the "OK" key 308 in the caution message screen 300 is accepted in step S17 (S17: YES), the CPU 20a advances the process to step S201.

In step S201, the CPU 20a determines whether the substituted font corresponds to horizontal writing. The determination is made based on a result of the analysis performed in step S1 described above. Here, when the substituted font corresponds to horizontal writing (S201: YES), for example, the CPU 20a advances the process to step S203. On the other hand, when the substituted font does not correspond to horizontal writing, that is, when the substituted font corresponds to vertical writing (S201: NO), the CPU 20a advances the process to step S205 described below.

In step S203, the CPU 20a sets the horizontal-writing priority table 558d as a reference target table to be referred to in step S209 described below. Then, the CPU 20a advances the process to step S207.

On the other hand, when the CPU 20a advances the process from step S201 to step S205, the CPU 20a sets, in step S205, the vertical-writing priority table 558e as a reference target table to be referred to in step S209 described below. Then, the CPU 20a advances the process to step S207.

In step S207, the CPU 20a sets "1" as a value of an index n for selecting one of the four regions in the preview image 606. Then, the CPU 20a advances the process to step S209.

In step S209, the CPU 20a refers to the reference target table set in step S203 or step S205 as described above. Then, the CPU 20a advances the process to step S211.

In step S211, the CPU 20a specifies a region having a priority level of "n", that is, a region "n", based on a result of the reference obtained in step S209. Then, the CPU 20a advances the process to step S213.

In step S213, the CPU 20a determines whether an object exists in the region "n" in the output image 200 (based on post-substitution data). This determination is made, for example, based on whether or not coverage (a ratio of a portion other than a base to the entire region "n") in the region "n" is greater than a predetermined threshold value. Here, for example, when an object is included in the region "n", that is, when the coverage in the region "n" is greater than the threshold value (S213: YES), the CPU 20a advances the process to step S19. By this, the preview screen 600 as shown in FIG. 14 is then displayed on the display 28a in step S19. Then, the frame 612 is attached to the region "n" (in a corresponding region) in the preview image 606. On the other hand, in step S213, when any object is not included in the region "n", that is, when the coverage in the region "n" is not greater than the threshold value (S213: NO), the CPU 20a advances the process to step S215.

In step S215, the CPU 20a increases, that is, increments, the value of the aforementioned index n by "1". Then, the CPU 20a returns the process to step S209.

As described above, according to the third embodiment, the frame 612 is attached to the region in the preview image 606 corresponding to the region where it is most likely that an object included in the output image 200 protrudes from the print range. Therefore, the user can intuitively recognize that, in the region with this frame 612, or more strictly, in the corresponding region in the output image 200, an object may protrude from the print range.

Note that, in the third embodiment, the region marked with the frame 612 in the preview image 606 is an example of a second region of the present disclosure. The enlarged image 616 is an example of a second enlarged image of the present disclosure. Although the enlarged image 616 was arranged simultaneously with the preview image 606, i.e., side by side on the same preview screen 600, the present disclosure is not limited to this. For example, the preview image 606 or the enlarged image 616 may be selectively disposed, that is, they may be separately disposed on different preview screens.

Furthermore, the frame 612 may be attached in a dynamic manner, for example, in a blinking manner. In addition, instead of the frame 612, other types of marking, such as appropriate patterns or colors, may be assigned. Also in this case, other types of marking, such as patterns and colors, may be attached in a dynamic manner.

Fourth Embodiment

Next, a fourth embodiment of the present disclosure will be described.

Figure 19:
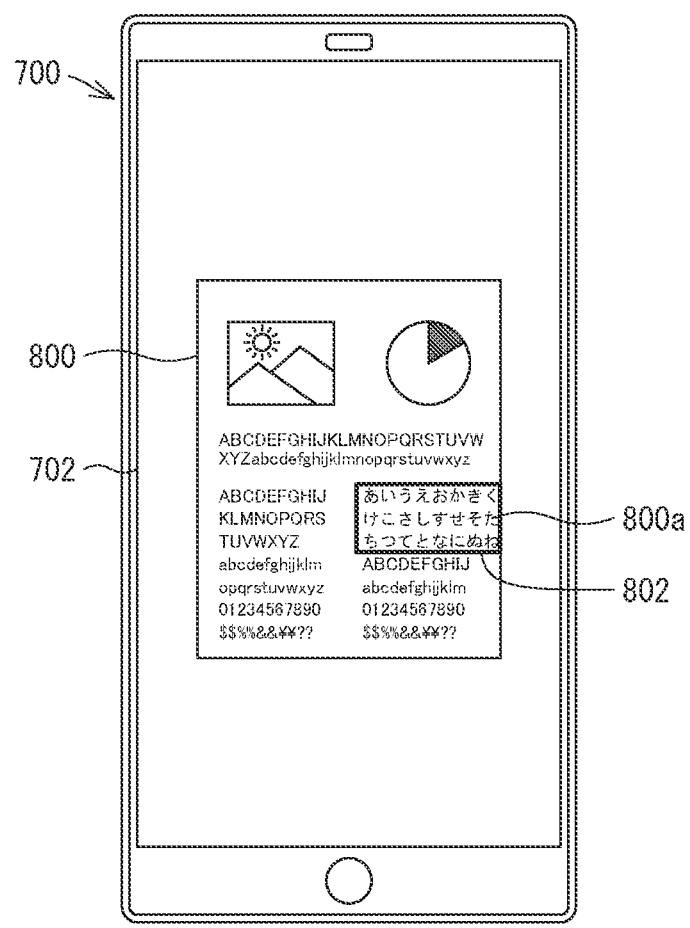
FIG. 19 is a diagram illustrating an example of a state in which a preview image is displayed on a display of a mobile terminal device according to a fourth embodiment of the present disclosure.

In the fourth embodiment, a preview image 800 is displayed on a display 702 of a mobile terminal device 700 as shown in FIG. 19. Also in the preview image 800, appropriate marking is applied to a font substitution corresponding portion 800a, that is, a rectangular frame 802 is attached, for example.

To achieve this state, preview image display data is transmitted from a multifunction peripheral 10 to the mobile terminal device 700. Then, in the mobile terminal device 700, an appropriate process is performed to display the preview image 800 on the display 702 based on the preview image display data received from the multifunction peripheral 10. Note that the multifunction peripheral 10 and the mobile terminal device 700 are wirelessly connected by WiFi, for example. The communication section 24, or in particular, the wireless communication section 24a is responsible for this process.

According to the fourth embodiment, a user can check the preview image 800 at hand by means of the mobile terminal device 700. Then, the user can check the preview image 800 in detail by appropriately operating (pinching in, pinching out, swiping, etc.) the mobile terminal device 700 or by displaying the preview image 800 in an enlarged manner, for example, and especially check the font substitution corresponding portion 800a in detail. As a result, operability of an entire system including the multifunction peripheral 10 and the mobile terminal device 700 is improved.

Note that, in the fourth embodiment, a wireless communication section 24a, which is responsible for connection between the multifunction peripheral 10 and the mobile terminal device 700, or specifically, a combination of the wireless communication section 24a and a CPU 20a controlling the wireless communication section 24a, is an example of a transmitter according to the present disclosure. Furthermore, the connection between the multifunction peripheral 10 and the mobile terminal device 700 may be made by other methods, such as Bluetooth or IrDA, instead of WiFi.

Furthermore, examples of the mobile terminal device 700 according to the fourth embodiment include a smartphone. The present disclosure is not limited to these, and other devices, such as a tablet, may be employed as the mobile terminal device 700.

Other Application Examples

Each of the above embodiments is a concrete example of the present disclosure and does not limit the technical scope of the present disclosure. The present disclosure is applicable to aspects other than these embodiments.

For example, in each of the embodiments, although it appears that application data provided for a print process by an office direct print function is data for one page, this is not the case. The present disclosure may be applied to both a case where the application data is for a single page and a case where the application data includes data for a plurality of pages.

Furthermore, although the external storage medium 50 and an appropriate server are taken as examples of a data source of application data provided for the print process by the office direct print function, the data source is not limited to these. For example, the mobile terminal device 700 shown in FIG. 19 may also be employed as a data source.

Furthermore, in each of the embodiments, although the multifunction peripheral 10 is taken as an example of an image forming apparatus, the image forming apparatus is not limited to this. The present disclosure may be applied to image forming apparatuses other than the multifunction peripheral 10, such as a printer.

In addition, each of the embodiments may be combined as appropriate.

The present disclosure is not limited to a configuration of an apparatus called an image forming apparatus, and may be provided also in a form of a program called a program for controlling the image forming apparatus and in a form of a method called a method for controlling the image forming apparatus.

Furthermore, the present disclosure may also be provided in a form of a non-transitory computer readable storage medium storing the program for controlling the image forming apparatus. In this case, the control programs recorded on the storage medium are read by a computer of the image forming apparatus and executed by the computer to realize an image forming apparatus similar to the present disclosure. The storage medium referred to herein is a portable medium, such as the external storage medium 50 described above. Furthermore, instead of a portable medium, an embedded (built-in) medium incorporated in an image forming apparatus, such as a ROM or a hard disk drive, may also be applied as the storage medium referred to herein.

What is claimed is:

1. An image forming apparatus that accepts an input of application data generated by predetermined application software or compatible application software compatible with the predetermined application software and that is capable of executing a print process based on the application data, the image forming apparatus comprising:
   an analyzer that analyzes the application data;
   a determiner that determines whether a font included in the application data is to be substituted based on a result of the analysis performed by the analyzer;
   a caution information outputter that outputs predetermined caution information when the determiner determines that the font is to be substituted; and
   a preview image display that displays, when the determiner determines that the font is to be substituted, a preview image based on post-substitution data obtained after the font is substituted, wherein
   the preview image display displays the preview image with a predetermined first marking applied to a portion corresponding to the substitution of the font in the preview image, and
   the preview image display applies, when a second marking based on original application data is applied in advance to the portion corresponding to the substitution of the font in the preview image, the first marking of a different type from the second marking.

2. The image forming apparatus according to claim 1, wherein the preview image display applies the first marking in a dynamic manner.

3. The image forming apparatus according to claim 1, wherein the preview image display selectively displays a first enlarged image obtained by enlarging a first region which is a portion of the preview image including a portion corresponding to the substitution of the font or the preview image or simultaneously displays the first enlarged image and the preview image.

4. The image forming apparatus according to claim 1, wherein
   the preview image display selectively displays a second enlarged image obtained by enlarging a second region in the preview image or the preview image or simultaneously displays the second enlarged image and the preview image, and
   the second region is a portion including a protrusion corresponding portion in the preview image corresponding to a portion in which an object included in the post-substitution data is likely to protrude from a print range of the print process.

5. The image forming apparatus according to claim 4, wherein the preview image display displays the preview image with predetermined third marking applied to the second region.

6. The image forming apparatus according to claim 4, wherein the preview image display defines the second region based on whether the substituted font corresponds to horizontal writing or vertical writing.

7. The image forming apparatus according to claim 1, further comprising:
   a transmitter that transmits preview image display data for displaying the preview image in a display included in a mobile terminal device, to the mobile terminal device.

8. A non-transitory computer readable storage medium including a program for controlling an image forming apparatus that accepts an input of application data generated by predetermined application software or compatible application software compatible with the predetermined application software and that is capable of executing a print process based on the application data, the control program causing a computer of the image forming apparatus to execute:
   analyzing the application data;
   determining whether a font included in the application data is to be substituted based on a result of the analysis;
   outputting predetermined caution information when it is determined that the font is to be substituted; and
   displaying, when it is determined that the font is to be substituted, a preview image based on post-substitution data obtained after the font is substituted, wherein
   the displaying displays the preview image with predetermined a first marking applied to a portion corresponding to the substitution of the font in the preview image, and
   the displaying applies, when a second marking based on original application data is applied in advance to the portion corresponding to the substitution of the font in the preview image, the first marking of a different type from the second marking.

9. A method for controlling an image forming apparatus that accepts an input of application data generated by predetermined application software or compatible application software compatible with the predetermined application software and that is capable of executing a print process based on the application data, the control method comprising:

analyzing the application data;

determining whether a font included in the application data is to be substituted based on a result of the analysis;

outputting predetermined caution information when it is determined that the font is to be substituted; and displaying, when it is determined that the font is to be substituted, a preview image based on post-substitution data obtained after the font is substituted, wherein the displaying displays the preview image with predetermined a first marking applied to a portion corresponding to the substitution of the font in the preview image, and the displaying applies, when a second marking based on original application data is applied in advance to the portion corresponding to the substitution of the font in the preview image, the first marking of a different type from the second marking.

* * * * *